(12) United States Patent
Loss et al.

(10) Patent No.: US 7,191,983 B2
(45) Date of Patent: Mar. 20, 2007

(54) METHODS AND SYSTEMS FOR CONTROLLING FLAMMABILITY CONTROL SYSTEMS IN AIRCRAFT AND OTHER VEHICLES

(75) Inventors: Kevin L. Loss, Seattle, WA (US); David A. Adkins, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/368,894

(22) Filed: Mar. 6, 2006

(65) Prior Publication Data

US 2006/0151670 A1 Jul. 13, 2006

Related U.S. Application Data

(60) Division of application No. 10/788,822, filed on Feb. 27, 2004, now Pat. No. 7,007,893, which is a continuation-in-part of application No. 10/708,110, filed on Feb. 10, 2004.

(51) Int. Cl.
*B64D 37/02* (2006.01)
*B64D 37/04* (2006.01)

(52) U.S. Cl. ................................. 244/135 R
(58) Field of Classification Search ............. 244/129.2, 244/153 R, 135 A, 135 B, 135 C; 141/1, 141/62–64, 66, 94, 95, 198; 96/4–9
See application file for complete search history.

(56) References Cited

U.S. PATENT DOCUMENTS

| | | | | |
|---|---|---|---|---|
| 2,796,053 A * | 6/1957 | Lechtenberg | ............ | 123/41.65 |
| 3,229,446 A * | 1/1966 | Sebastian et al. | ............. | 95/265 |
| 3,847,298 A * | 11/1974 | Hamilton | .................... | 220/88.3 |
| 4,019,649 A * | 4/1977 | Simon | ........................ | 220/88.3 |
| 4,209,993 A * | 7/1980 | Rannenberg | .................. | 62/80 |
| 4,378,920 A * | 4/1983 | Runnels et al. | ......... | 244/135 R |
| 4,466,202 A * | 8/1984 | Merten | ........................ | 34/470 |
| 4,556,180 A * | 12/1985 | Manatt | .................... | 244/135 R |
| 4,589,614 A * | 5/1986 | Stevens | ...................... | 244/136 |
| 4,651,952 A * | 3/1987 | Tavano | ......................... | 244/2 |

(Continued)

OTHER PUBLICATIONS

FAA suggests Airbus modify jets to reduce risk, USA Today, Nov. 19, 2003, 1 pg.

(Continued)

*Primary Examiner*—Teri Pham Luu
*Assistant Examiner*—Stephen A. Holzen
(74) *Attorney, Agent, or Firm*—Perkins Coie LLP

(57) ABSTRACT

Methods and systems for controlling fuel tank flammability control systems are disclosed herein. In one embodiment, a system for use with an aircraft or other vehicle includes a flammability control system and a controller operably coupled to the flammability control system. The flammability control system can be configured to control the development of flammable vapors in a fuel tank of the vehicle. The controller can be configured to receive one or more signals relating to a condition of the fuel tank and control operation of the flammability control system at least partially in response to the one or more fuel tank condition signals. In another embodiment, the controller can be configured to receive one or more signals relating to an operational phase of the aircraft and control operation of the flammability control system at least partially in response to the one or more aircraft operation signals.

23 Claims, 4 Drawing Sheets

U.S. PATENT DOCUMENTS

| | | | | |
|---|---|---|---|---|
| 4,784,354 | A * | 11/1988 | Tavano | 244/135 B |
| 4,886,225 | A * | 12/1989 | Bates | 244/135 R |
| 5,069,692 | A * | 12/1991 | Grennan et al. | 96/4 |
| 5,442,905 | A * | 8/1995 | Claeys et al. | 60/785 |
| 5,541,591 | A * | 7/1996 | Bush | 340/968 |
| 5,626,052 | A * | 5/1997 | Lawson | 73/304 C |
| 5,859,598 | A * | 1/1999 | Wade | 340/960 |
| 5,936,552 | A * | 8/1999 | Wichgers et al. | 340/963 |
| 5,955,972 | A * | 9/1999 | Wade | 340/960 |
| 6,136,267 | A * | 10/2000 | Bergman | 422/41 |
| 6,314,947 | B1 * | 11/2001 | Roche | 123/525 |
| 6,343,465 | B1 * | 2/2002 | Martinov | 60/204 |
| 6,435,164 | B1 * | 8/2002 | Kaiser et al. | 123/516 |
| 6,491,739 | B1 * | 12/2002 | Crome et al. | 95/14 |
| 6,535,811 | B1 * | 3/2003 | Rowland et al. | 701/115 |
| 6,547,188 | B2 * | 4/2003 | Schmutz et al. | 244/135 R |
| 6,585,192 | B2 * | 7/2003 | Beers | 244/135 R |
| 6,634,598 | B2 * | 10/2003 | Susko | 244/135 R |
| 6,676,081 | B2 * | 1/2004 | Grabow et al. | 244/129.2 |
| 6,682,016 | B1 * | 1/2004 | Peroulakis | 244/57 |
| 6,739,359 | B2 * | 5/2004 | Jones et al. | 141/64 |
| 7,007,893 | B2 * | 3/2006 | Loss et al. | 244/129.2 |
| 2003/0048203 | A1 * | 3/2003 | Clary et al. | 340/945 |
| 2004/0004356 | A1 * | 1/2004 | Akimoto et al. | 290/1 B |
| 2004/0023083 | A1 * | 2/2004 | Yang et al. | 429/13 |
| 2005/0040249 | A1 * | 2/2005 | Wacker et al. | 236/51 |
| 2005/0103193 | A1 * | 5/2005 | Lyons et al. | 95/54 |
| 2005/0151019 | A1 * | 7/2005 | Stevens | 244/135 R |
| 2005/0173017 | A1 * | 8/2005 | Moravec et al. | 141/66 |
| 2005/0178916 | A1 * | 8/2005 | Howe | 244/135 R |
| 2006/0168968 | A1 * | 8/2006 | Zielinski et al. | 60/778 |

OTHER PUBLICATIONS

FAA to Order Fuel Safety Systems on Jets, Associated Press; http://abcnews.go.com/wire/US/ap20040217_1484.html [accessed Feb. 18, 2004].

Levin Alan, "FAA to require airlines to make fuel tanks safer," Seattle Times, Feb. 17, 2004, 2 pgs.

Moravac, Bradford et al., "Commerical Aircraft On-Board Inerting System", 17 pgs, [date unknown].

Wald, Matthew, "U.S. Plans to Require Airlines to Improve Fuel Tank Safety", http://www.nytimes.com/2004/02/18/national/18FUEL.html [accessed Feb. 18, 2004].

* cited by examiner

METHODS AND SYSTEMS FOR CONTROLLING FLAMMABILITY CONTROL SYSTEMS IN AIRCRAFT AND OTHER VEHICLES

CROSS-REFERENCE TO RELATED APPLICATION

This application is a divisional of U.S. application Ser. No. 10/788,822, filed on Feb. 27, 2004, now U.S. Pat. No. 7,007,893 which is a Continuation-In-Part of co-pending U.S. patent application Ser. No. 10/708,110, entitled "COMMERCIAL AIRCRAFT ON-BOARD INERTING SYSTEM," filed on Feb. 10, 2004.

TECHNICAL FIELD

The following disclosure relates generally to fuel tank flammability control systems and, more particularly, to methods and systems for controlling such systems.

BACKGROUND

Recent Federal Aviation Regulations require that new transport aircraft include systems that reduce the development of flammable vapors in fuel tanks. One approach for minimizing the development of flammable vapors is to utilize an "inerting system" that flows an inert gas, such as nitrogen, into the fuel tank to reduce the oxygen concentration. The inert gas can be provided by high pressure bleed air from an engine compressor or an auxiliary power unit compressor. In either case, the high pressure air flows through a heat exchanger and then through air separation modules to separate the air into an oxygen-rich component that is exhausted overboard and an oxygen-depleted or inert gas component that flows into the fuel tank.

Another approach for reducing the development of flammable vapors in a fuel tank is to maintain the fuel tank at a relatively low temperature that is not conducive to the formation of such vapors. One method for doing so involves using an air conditioning system to displace warm air surrounding the fuel tank. Another method involves placing a cooling element, such as a cooling coil, inside the fuel tank to condense fuel vapors that may exist in the space above the fuel, i.e., in the ullage.

One shortcoming associated with existing systems for minimizing flammable vapors is that they typically operate on a full-time basis during the entire flight and all ground operations. The Federal Aviation Regulations, however, do not require full-time operation for compliance with the new rule. For example, selective use of fuel tank inerting complies with the rule if it can be shown that the probability of fuel tank flammability is significantly lower under certain conditions or during a particular phase of flight.

SUMMARY

The present invention is directed generally toward methods and systems for controlling flammability control systems in aircraft and other vehicles. A vehicle system configured in accordance with one aspect of the invention includes a flammability control system and a controller operably coupled to the flammability control system. The flammability control system can be configured to suppress the development of flammable vapors in a fuel tank of a vehicle, such as an aircraft. The controller can be configured to receive one or more signals relating to a condition of the fuel tank. In addition, the controller can be further configured to control operation of the flammability control system at least partially in response to the one or more signals.

In another aspect of the invention, the controller can be configured to receive a temperature signal relating to a temperature condition of the fuel tank. In this aspect, the controller can be further configured to control operation of the flammability control system at least partially in response to the temperature signal. In a further aspect of the invention, the controller can be configured to receive a pressure signal relating to a pressure condition of the fuel tank. In this aspect, the controller can be further configured to control operation of the flammability control system at least partially in response to the pressure signal. In yet another aspect of the invention, the controller can be configured to receive one or more signals relating to an operational phase of the vehicle. In this aspect, the controller can be further configured to control operation of the flammability control system at least partially in response to the one or more aircraft operation signals.

A method for controlling a flammability control system in accordance with one aspect of the invention can include operating the flammability control system at a first level to suppress the development of flammable vapors in a fuel tank of a vehicle, such as an aircraft. The method can further include receiving one or more signals relating to a condition of the fuel tank. When the one or more signals correspond to a first oxygen concentration in the fuel tank, the method can additionally include continuing to operate the flammability control system at the first level. Alternatively, when the one or more signals correspond to a second oxygen concentration in the fuel tank that is less than the first oxygen concentration, the method can additionally include at least reducing the operating level of the flammability control system from the first level to a second level that is less than the first level. In another aspect of this method, at least reducing the operating level of the flammability control system can include switching the flammability control system off.

DETAILED DESCRIPTION

The following disclosure describes methods and systems for controlling fuel tank flammability control systems on aircraft and other vehicles. Certain details are set forth in the following description and in FIGS. 1–4 to provide a thorough understanding of various embodiments of the invention. Other details describing well known structures and systems often associated with aircraft and flammability control systems are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
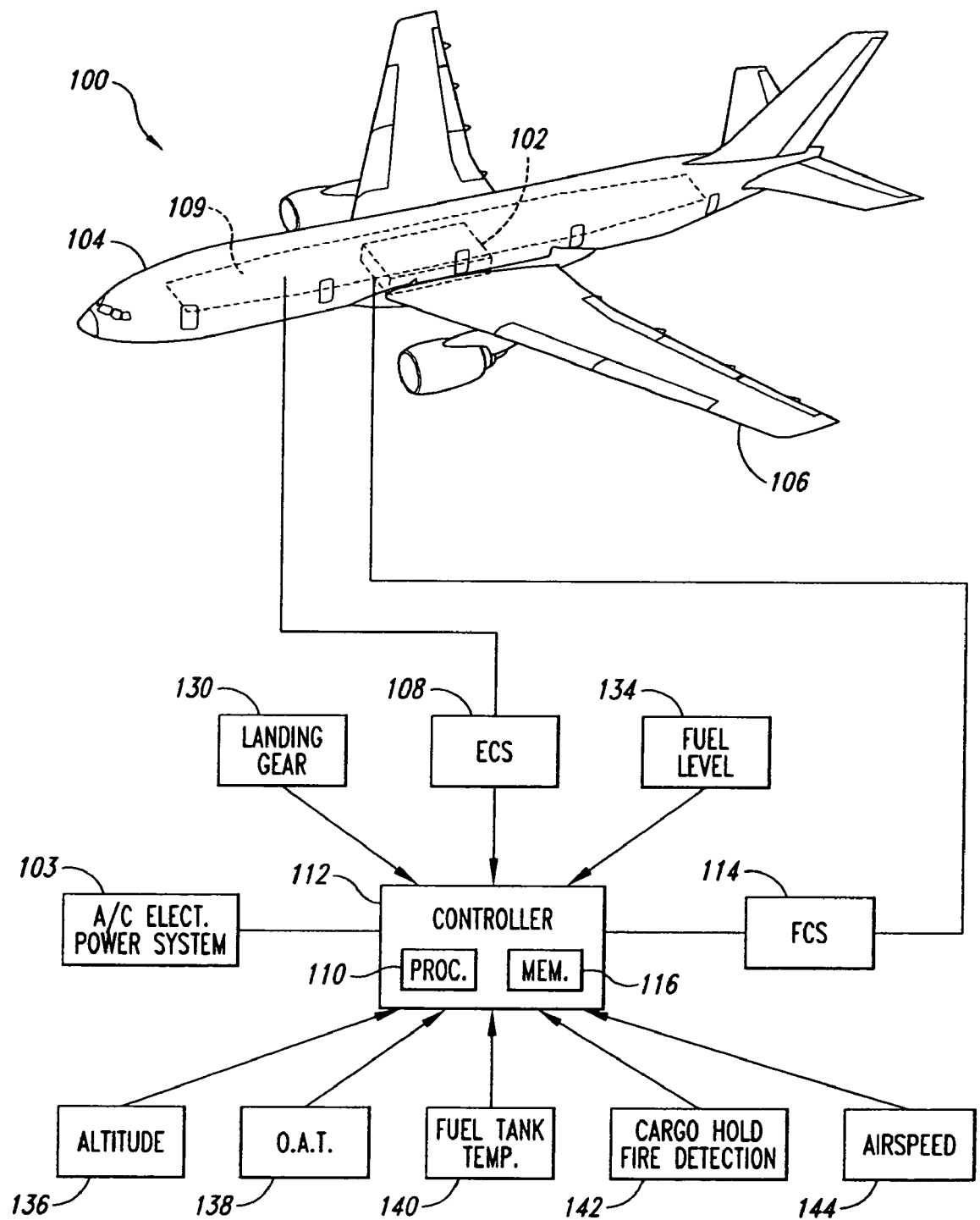
FIG. 1 is a partially schematic isometric view of an aircraft having a flammability control system controller configured in accordance with an embodiment of the invention.

FIG. 1 is a partially schematic isometric view of an aircraft 100 having a flammability control system (FCS) 114 operably coupled to a fuel tank 102 in accordance with an embodiment of the invention. In one aspect of this embodiment, the fuel tank 102 is a center-wing tank positioned at least partially in a fuselage 104 of the aircraft 100 adjacent to a wing 106. In other embodiments, the FCS 114 can be operably coupled to one or more other fuel tanks in the aircraft 100, such as additional fuel tanks positioned in the wing 106 and/or the fuselage 104. The fuel tank 102 can be positioned at least proximate to an environmental control system (ECS) 108 shown schematically in FIG. 1. The ECS 108 can be configured to control various parameters in a fuselage cabin 109, such as air temperature, pressure, and humidity.

In another aspect of this embodiment, the FCS 114 can be configured to suppress or otherwise control the development of flammable vapors in the fuel tank 102. For example, in one embodiment, the FCS 114 can include an inerting system, such as an inert gas generation system, that flows inert gas, such as nitrogen, into the fuel tank 102 to either maintain the existing oxygen concentration level or reduce the oxygen concentration level. In another embodiment, the FCS 114 can include a thermal control system, such as an air conditioning system, configured to cool the environment surrounding the fuel tank 102 to reduce the production of fuel vapors. In a further embodiment, the FCS 114 can include a chiller or other cooling element positioned within the fuel tank 102 to condense fuel vapors out of the tank ullage. In yet other embodiments, the FCS 114 can include other systems for controlling fuel tank flammability, such as inert gas storage bottles configured to flow inert gas into the fuel tank 102. The foregoing list of flammability control systems is not exhaustive and represents some systems configured in accordance with and/or usable in accordance with aspects of the present invention. Accordingly, aspects of the present invention are not limited to the particular types of flammability control systems enumerated above.

In a further aspect of this embodiment, the aircraft 100 also includes a controller 112 operably coupled to the FCS 114. The controller 112 can be configured to receive electrical power from an aircraft electric power system 103. In addition, the controller 112 can also be configured to receive one or more signals from a plurality of aircraft systems and/or a plurality of aircraft sensors. For example, in one embodiment, the controller 112 can be configured to receive one or more signals from aircraft systems such as a landing gear system 130, an ECS 108, and a fuel gauge 134 operably coupled to the fuel tank 102. The controller 112 can be further configured to receive one or more signals from aircraft sensors such as an altitude sensor 136, an outside air temperature (OAT) sensor 138, a fuel tank temperature sensor 140, and a cargo hold fire detection sensor 142.

In yet another aspect of this embodiment, the controller 112 includes a processor 110 configured to execute computer-readable instructions stored on a computer-readable medium, such as a memory 116. As described in greater detail below, in one embodiment, the computer-readable instructions can cause the processor 110 to output control signals for the FCS 114 in response to the one or more signals received from the aircraft systems and/or the aircraft sensors described above. For example, in one embodiment, the controller 112 can be configured to switch the FCS 114 "off" when the one or more signals indicate that the level of flammable vapors in the fuel tank 102 is well below a preselected upper limit. In another embodiment, the controller 112 can be configured to switch the FCS 114 off when the one or more signals indicate that the oxygen concentration in the fuel tank 102 is at or below an inert limit. For example, in one embodiment, the controller 112 can be configured to switch the FCS 114 off when the oxygen concentration is less than about 18%, such as about 12%. In a further embodiment, the controller 112 can be configured to switch the FCS 114 off when the one or more signals indicate that the aircraft 100 is operating in a phase of flight in which the level of flammable vapors in the fuel tank 102 is well below the preselected upper limit. For example, in one embodiment, the controller 112 can be configured to switch the FCS 114 off when the aircraft is parked on the ground on a relatively cool day.

The operating costs of the aircraft 100 can be reduced by using the FCS 114 on an as-needed basis rather than a full-time basis. For example, using the FCS 114 in this manner can reduce the service and maintenance requirements of the FCS 114. In addition, if the FCS 114 includes an inert gas system utilizing, for example, air separation modules, then using the FCS 114 on an as-needed basis can extend the life of the air separation modules. Moreover, if the FCS 114 includes an inert gas system utilizing engine bleed air, the operating costs of the aircraft 100 can be further reduced by reducing the amount of bleed air extracted from the engines, leading to greater fuel efficiency.

Figure 2:
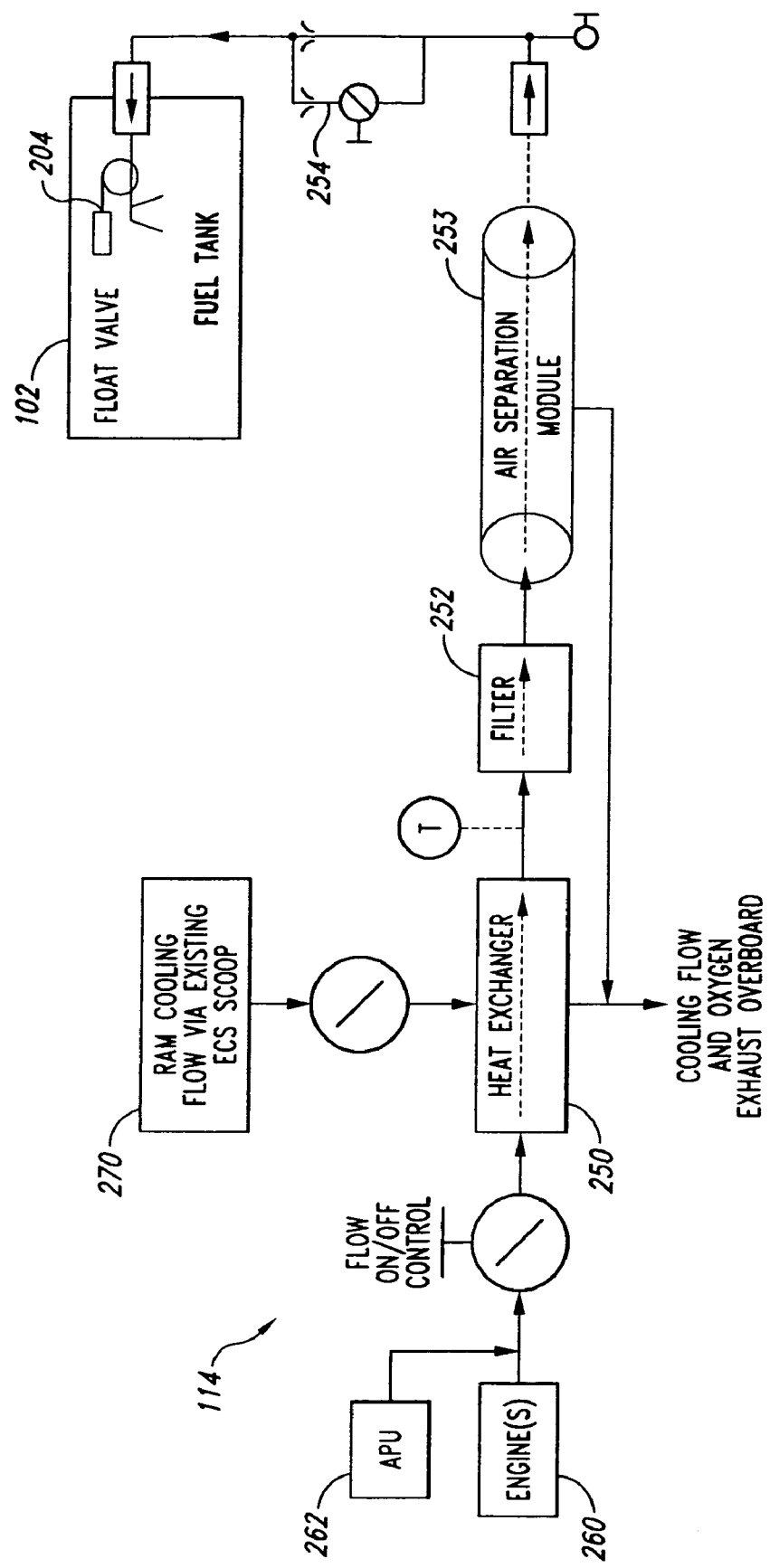
FIG. 2 is a schematic diagram illustrating a flammability control system configured in accordance with an embodiment of the invention.

FIG. 2 is a schematic diagram illustrating the FCS 114 of FIG. 1 configured in accordance with one embodiment of the invention. In the illustrated embodiment, the FCS 114 includes an inert gas generation system that is at least generally similar in structure and function to the inert gas generation system described in co-pending U.S. patent application Ser. No. 10/708,110, entitled "COMMERCIAL AIRCRAFT ON-BOARD INERTING SYSTEMS," filed on Feb. 10, 2004, and incorporated herein this embodiment, the FCS 114 includes a heat exchanger 250, an air filter 252, and at least one air separation module (ASM) 253.

In operation, the heat exchanger 250 receives high pressure/high temperature bleed air from one or more aircraft engines 260. Alternatively, if the one or more aircraft engines 260 are not operating, the heat exchanger 250 can receive high pressure air from another source, such as a compressor driven by an auxiliary power unit 262. The heat exchanger 250 cools the high pressure/high temperature air using cool air from an on-board cool air source, such as a ram air cooling system 270. In other embodiments, the heat exchanger 250 can cool the high pressure/high temperature air using cool air from other sources, such as an on-board air conditioning system. For ground use, the heat exchanger 250 can utilize cooling air from an external source.

The high pressure air exits the heat exchanger 250 and passes through the air filter 252 to remove water vapor, hydrocarbons, particulate matter, and/or other undesirable components. The filtered air then passes to the ASM 253 for separation into inert gas and oxygen-enriched waste gas. The oxygen-enriched waste gas is piped overboard from the ASM 253 along with the cooling flow from the heat exchanger 250. The inert gas, such as nitrogen-enriched air (NEA), exits the ASM 253 and passes through a check valve 254 before flowing into the fuel tank 102. The check valve 254 and a float valve 204 positioned in the fuel tank 102 prevent reverse flow of fuel or fuel vapors from the fuel tank 102 into the FCS 114.

Although the FCS 114 described above with reference to FIG. 2 is configured to flow NEA into the fuel tank 102, in other embodiments, other inert gas systems having similar or different configurations can be used to flow other inert gases into the fuel tank 102. For example, in another embodiment, other inert gases, such as argon, can be flowed into the fuel tank 102 from storage tanks or other suitable storage devices.

Figure 3:
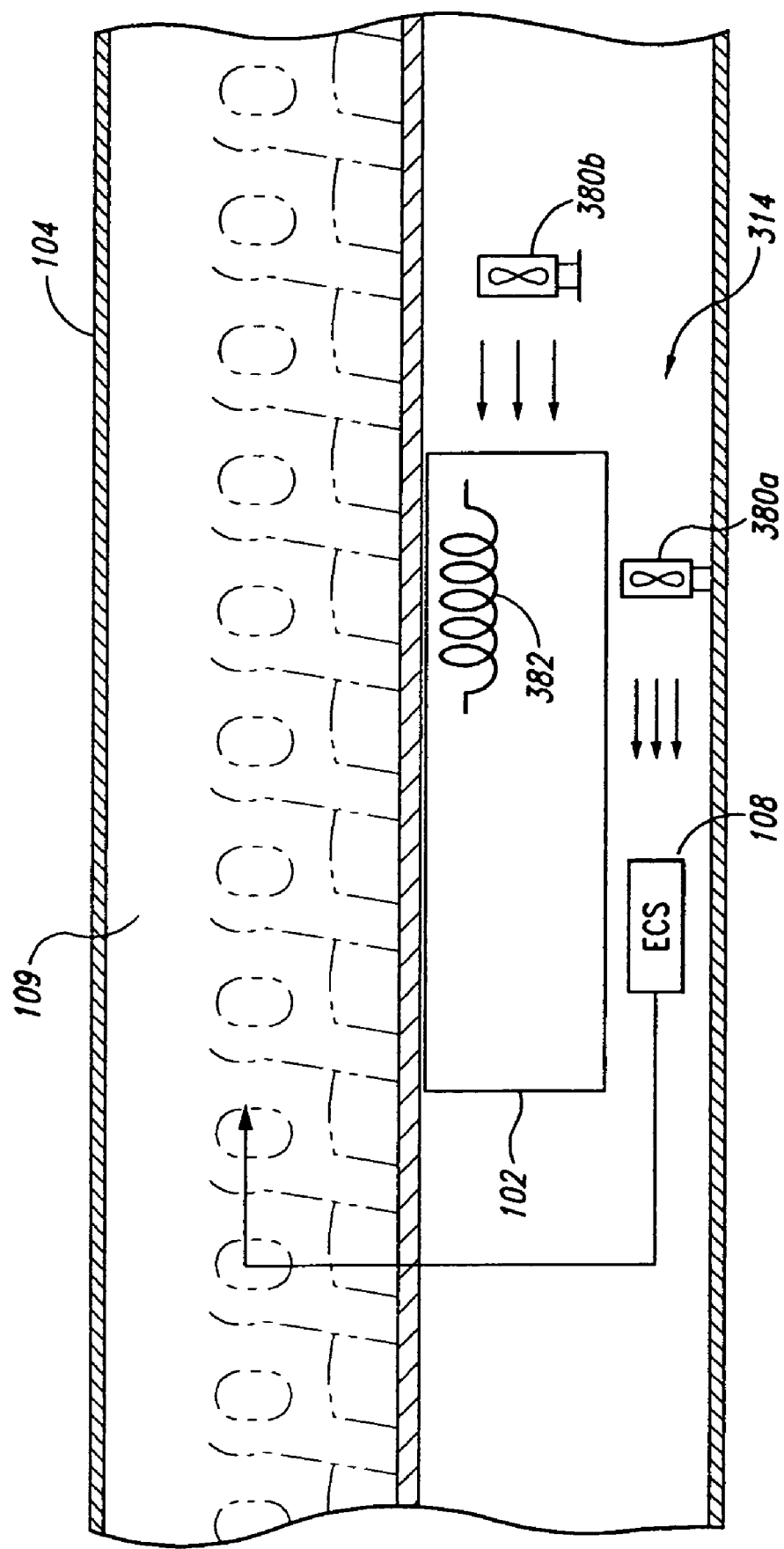
FIG. 3 is an enlarged, partially schematic, cut-away side view of a portion of a fuselage illustrating a flammability control system configured in accordance with another embodiment of the invention.

FIG. 3 is an enlarged, partially schematic, cut-away side view of a portion of the fuselage 104 of FIG. 1 illustrating an FCS 314 configured in accordance with another embodiment of the invention. In one aspect of this embodiment, the ECS 108 is positioned below the fuel tank 102 in the fuselage 104 and provides conditioning air to the fuselage cabin 109. When the ECS 108 is operating, it can give off heat that raises the temperature of the fuel tank 102. Accordingly, the FCS 314 can include one or more fans 380 (identified individually as a first fan 380a and a second fan 380b) configured to cool the fuel tank 102 and/or displace hot air generated by the ECS 108. By reducing the temperature of the fuel tank 102, the FCS 314 can reduce the formation of flammable vapors in the fuel tank 102. In a further aspect of this embodiment, the FCS 314 also includes a chiller, such as a cooling coil 382, positioned in the fuel tank 102 toward an upper portion of the fuel tank. In one embodiment, the cooling coil 382 can reduce the ullage temperature inside the fuel tank 102 to condense at least a portion of the flammable vapors present in the space above the fuel.

Figure 4:
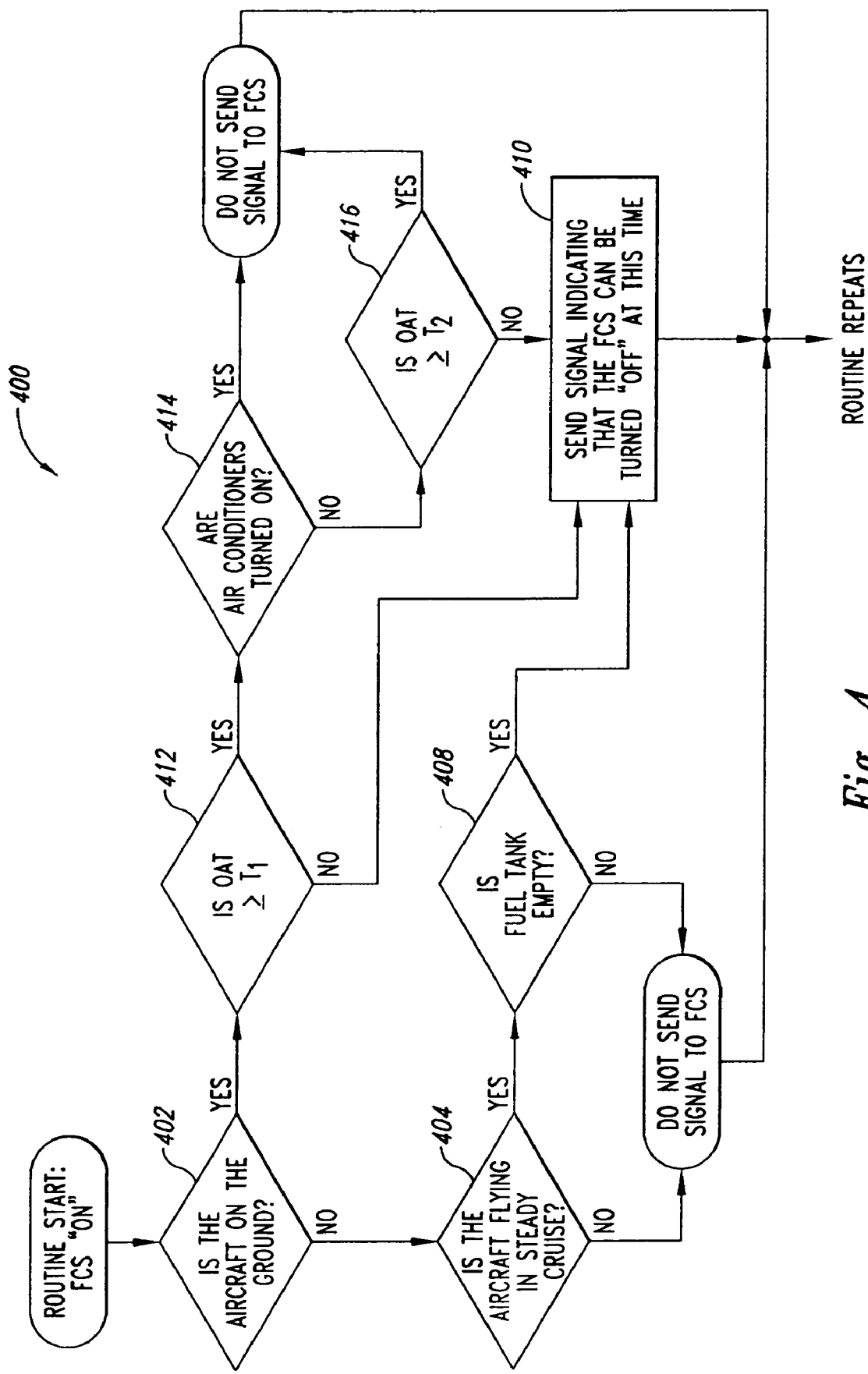
FIG. 4 is a flow diagram illustrating a routine for controlling a flammability control system in accordance with an embodiment of the invention.

FIG. 4 is a flow diagram illustrating a routine 400 for controlling an FCS in accordance with an embodiment of the invention. In one aspect of this embodiment, the routine 400 can be implemented by the controller 112 of FIG. 1 for controlling the FCS 114 illustrated in FIGS. 1 and 2. More specifically, in this embodiment, the routine 400 can be implemented by the processor 110 of the controller 112 in accordance with computer-readable instructions stored in the memory 116. In other embodiments, the routine 400 can be implemented by the controller 112 for controlling other FCSs, such as the FCS 314 of FIG. 3. In further embodiments, the routine 400 can be implemented by other controllers for controlling yet other FCSs.

In one aspect of this embodiment, the routine 400 starts with the FCS operating, i.e., with the FCS switched "on." In decision block 402, the routine determines whether the aircraft is on the ground. In one embodiment, this determination can be made based on one or more signals received from the landing gear system 130 described above with reference to FIG. 1. If the aircraft is not on the ground (i.e., the aircraft is flying), then the routine proceeds to decision block 404 to determine whether the aircraft is flying in steady cruise mode. In one embodiment, this determination can be made based on one or more signals received from the altitude sensor 136 (and/or a rate-of-climb indicator) and the airspeed sensor 144 (FIG. 1). If the aircraft is not flying in steady cruise mode (for example, if the aircraft is climbing or descending), then the routine repeats without sending a signal to the FCS changing the operating status of the FCS. That is, the routine repeats without switching the FCS "off" or sending a signal to the FCS instructing the FCS to reduce output.

Conversely, if the aircraft is flying in steady cruise mode, then the routine proceeds from decision block 404 to decision block 408 to determine whether the fuel tank is empty. In one embodiment, this determination can be made based on one or more signals from the fuel gauge 134 described above with reference to FIG. 1. If the fuel tank is not empty, then the routine repeats without sending a signal to the FCS changing the operating status of the FCS. Conversely, if the fuel tank is empty, then the routine proceeds to block 410 and sends a signal to the FCS changing the operating status of the FCS. For example, in one embodiment, the routine sends a signal to the FCS instructing the FCS to at least temporarily stop operating. Alternatively, in another embodiment, the routine can send a signal to the FCS instructing the FCS to reduce output. For example, if the FCS includes an inert gas system, then the signal can instruct the FCS to reduce the flow of inert gas to the fuel tank. In another embodiment in which the FCS includes a thermal control system having one or more air conditioning fans, the signal can instruct the FCS to reduce or cut power to the fans. In other embodiments, the routine can instruct the FCS to take other energy-conserving measures when the fuel tank is empty and the aircraft is in steady cruise mode. After performing block 410, the routine repeats.

Returning to decision block 402, if the aircraft is on the ground, then the routine proceeds to decision block 412 to determine if the OAT is greater than or equal to $T_1$. In one embodiment, $T_1$ can be associated with a warm day. For example, in one embodiment, $T_1$ can be equal to about 70° F. In other embodiments, $T_1$ can be equal to lower or higher temperatures depending on various parameters such as fuel tank configuration and proximity to heat generating systems, such as ECS systems.

If the OAT is less than $T_1$ (e.g., a cool day), then the routine proceeds to block 410 and sends a signal to the FCS changing the operating status of the FCS. For example, in one embodiment, the routine can send a signal to the FCS instructing the FCS to at least temporarily stop operating. Alternatively, in another embodiment, the routine can send a signal to the FCS instructing the FCS to reduce output.

Returning to decision block 412, if the OAT is greater than or equal to $T_1$ (e.g., a warm day), then the routine proceeds to decision block 414 to determine whether the aircraft ECS 108 (FIGS. 1 and 3) is operating. As discussed above with reference to FIG. 3, in one embodiment, the ECS 108 can be positioned at least proximate to the fuel tank. As a result, when the ECS 108 is operating, it can give off heat that warms the fuel tank in a manner that may be conducive to the formation of fuel vapors. Accordingly, if the ECS 108 is operating, then the routine repeats without sending a signal to the FCS changing the operating status of the FCS.

If the ECS 108 is not operating, then the routine proceeds to decision block 416 to determine whether the OAT is greater than or equal to $T_2$. In one embodiment, $T_2$ may be associated with a relatively hot day. For example, in one embodiment, $T_2$ can be equal to about 90° F. In other embodiments, $T_2$ can be equal to other temperatures less than or greater than 90° F. depending on various parameters such as fuel tank configuration and proximity to other aircraft systems that may generate heat.

If the OAT is greater than or equal to $T_2$ (e.g., a hot day), then the routine repeats without sending a signal to the FCS changing the operating status of the FCS. Conversely, if the OAT is less than $T_2$, then the routine proceeds from decision block 416 to block 410 and sends a signal to the FCS changing the operating status of the FCS. For example, in one embodiment, the routine can send a signal to the FCS instructing the FCS to at least temporarily stop operating. After performing block 410, the routine repeats.

Although FIG. 4 illustrates one routine for controlling an FCS in accordance with an embodiment of the invention, in other embodiments of the invention other routines can be used to control an FCS so that it is used on an as-needed basis rather than a full-time basis. For example, in one other embodiment, a routine for controlling an FCS can determine whether the aircraft is on the ground and, if the aircraft is on the ground, either switch the FCS off or reduce FCS output. Conversely, when the aircraft becomes airborne, the routine can either switch the FCS on or increase FCS output. In another embodiment, a routine for controlling an FCS can be configured to receive a signal from an oxygen meter that measures the oxygen concentration in a fuel tank. If the oxygen concentration exceeds a preselected value, such as 12%, then the routine can increase the output of an associated FCS to reduce the oxygen concentration in the tank. In yet another embodiment, a routine for controlling an FCS can be configured to receive a signal from a fire detection system, such as the cargo hold fire detection sensor 142 illustrated in FIG. 1. In this embodiment, the routine can increase the output of an associated FCS if the cargo hold fire detection sensor indicates that the conditions in the cargo hold are conducive to ignition. In a further embodiment, a routine for controlling an FCS can receive one or more signals from a fuel tank temperature sensor coupled to a portion of the fuel tank, such as a tank skin. In this embodiment, if the fuel tank temperature is conducive to the generation of flammable fuel vapors, then the routine can increase the output of an associated FCS to reduce the temperature of the fuel tank. Accordingly, the present invention is not limited to particular aspects of the routine described above with reference to FIG. 4, but extends to other routines and systems for controlling an FCS in accordance with the present disclosure.

One feature of the FCS control routines described above in accordance with the present invention is that they can be individually tailored to predict the heating and cooling rates of a fuel tank in a particular vehicle. For example, in one embodiment, an FCS control routine for a Boeing 737 class aircraft may have different operating parameters (e.g, "trigger points" and "limit values") than would an FCS control routine for a Boeing 777 class aircraft. One advantage of this feature is that it can facilitate wide application of the present invention and accurate FCS control regardless of the particular vehicle configuration.

From the foregoing, it will be appreciated that specific embodiments of the invention have been described herein for purposes of illustration, but that various modifications may be made without deviating from the spirit and scope of the invention. For example, although the foregoing disclosure describes flammability control systems and controllers for such systems in the context of aircraft, use of such systems is not limited to aircraft. To the contrary, flammability control systems and associated controllers that are at least generally similar in structure and function to those described herein can also be used with other vehicles, such as various land and water craft. Accordingly, the invention is not limited, except as by the appended claims.

We claim:

1. A vehicle system comprising:
    a flammability control system configured to suppress the development of flammable vapors in a fuel tank of a vehicle;
    a controller operably coupled to the flammability control system, wherein the controller is configured to receive a signal from an air conditioning system of the vehicle, and wherein the controller is further configured to control operation of the flammability control system at least partially in response to the signal from the air conditioning system; and
    a cooling fan, wherein the controller reduces power to the cooling fan when the one or more signals indicate that the level of flammable vapors in the fuel tank is at or below a preselected limit.

2. The vehicle system of claim 1 wherein the controller is configured to receive a signal from an airspeed indicator of an aircraft, and wherein the controller is further configured to control operation of the flammability control system at least partially in response to the signal from the airspeed indicator.

3. The vehicle system of claim 1 wherein the controller is configured to receive a signal from an altimeter of an aircraft, and wherein the controller is further configured to control operation of the flammability control system at least partially in response to the signal from the altimeter.

4. The vehicle system of claim 1 wherein the controller is configured to receive a signal from a fire detection sensor of the vehicle, and wherein the controller is further configured to control operation of the flammability control system at least partially in response to the signal from the fire detection sensor.

5. The vehicle system of claim 1 wherein the controller reduces power to the cooling fan when the one or more signals indicate that the probability of ignition in the fuel tank is at or below a preselected limit.

6. The vehicle system of claim 1 wherein the controller reduces power to the cooling fan when the one or more signals indicate that an oxygen concentration level in the fuel tank is at or below a preselected limit.

7. The vehicle system of claim 1 wherein the flammability control system includes a thermal control system configured to reduce the temperature of the fuel tank.

8. The vehicle system of claim 1 wherein the flammability control system includes an air conditioning system configured to reduce the temperature of air proximate to the fuel tank to reduce the temperature of the fuel tank.

9. A method for controlling a flammability control system, the method comprising:
    operating the flammability control system at a first level of operation to suppress the development of flammable vapors in a fuel tank of a vehicle;
    receiving one or more signals relating to an operational phase of the vehicle;
        when the one or more signals correspond to a first level of flammable vapors in the fuel tank, continuing to operate the flammability control system at the first level of operation; and
        when the one or more signals correspond to a second level of flammable vapors in the fuel tank that is less than the first level of flammable vapors, at least reducing the operating level of the flammability control system from the first level of operation to a second level of operation that is less than the first level of operation, wherein receiving one or more signals relating to an operational phase of the vehicle includes receiving a signal from a landing gear system of an aircraft.

10. The method of claim 9 wherein operating the flammability control system at a first level of operation includes flowing inert gas into the fuel tank at a first flow rate, and wherein at least reducing the operating level of the flammability control system includes flowing inert gas into the fuel tank at a second flow rate that is less than the first flow rate but not zero.

11. The method of claim 9 wherein receiving one or more signals relating to a condition of the fuel tank includes receiving a temperature signal.

12. The method of claim 9 wherein receiving one or more signals relating to a condition of the fuel tank includes receiving a temperature signal relating to an air temperature outside the fuel tank.

13. The method of claim 9 wherein receiving one or more signals relating to an operational phase of the vehicle includes receiving a signal from a rate-of-climb indicator of an aircraft.

14. The method of claim 9 wherein operating the flammability control system at a first level includes flowing inert gas into the fuel tank, and wherein at least reducing the operating level of the flammability control system includes stopping the flow of inert gas into the fuel tank.

15. A method for controlling a flammability control system, the method comprising:
   operating the flammability control system at a first level of operation to suppress the development of flammable vapors in a fuel tank of a vehicle;
   receiving one or more signals relating to an operational phase of the vehicle;
   when the one or more signals correspond to a first level of flammable vapors in the fuel tank, continuing to operate the flammability control system at the first level of operation; and
   when the one or more signals correspond to a second level of flammable vapors in the fuel tank that is less than the first level of flammable vapors, at least reducing the operating level of the flammability control system from the first level of operation to a second level of operation that is less than the first level of operation, wherein operating the flammability control system at a first level of operation includes flowing inert gas into the fuel tank, wherein receiving one or more signals relating to an operational phase of the vehicle includes receiving a signal from a landing gear system of an aircraft, and wherein at least reducing the operating level of the flammability control system includes at least reducing the flow of inert gas into the fuel tank when the one or more signals indicate that the aircraft is on the ground.

16. The method of claim 15 wherein at least reducing the operating level of the flammability control system includes stopping the flow of inert gas into the fuel tank.

17. A computer-readable medium including computer-readable instructions configured to cause a controller to control a flammability control system by a method comprising:
   receiving one or more signals relating to at least one of a condition of a fuel tank and an operational phase of a vehicle;
   when the one or more signals correspond to a first level of flammable vapors in the fuel tank, operating or continuing to operate the flammability control system at a first level of operation; and
   when the one or more signals correspond to a second level of flammable vapors in the fuel tank that is less than the first level of flammable vapors, operating or continuing to operate the flammability control system at a second level of operation that is less than the first level of operation, wherein operating the flammability control system at a first level of operation includes operating at least one cooling fan at a first level to cool the fuel tank, and wherein operating the flammability control system at a second level of operation includes at least reducing power to the cooling fan.

18. The computer-readable medium of claim 17 wherein operating the flammability control system at a first level of operation includes flowing inert gas into the fuel tank, and wherein operating the flammability control system at a second level of operation includes at least reducing the flow of inert gas into the fuel tank.

19. The computer-readable medium of claim 17 wherein operating the flammability control system at a first level of operation includes flowing compressed air to an inert gas generation system, and wherein operating the flammability control system at a second level of operation includes at least reducing the flow of compressed air to the inert gas generation system.

20. A system for controlling a flammability control system, the system for controlling comprising:
   receiving means for receiving one or more signals relating to at least one of a condition of a fuel tank and an operational phase of a vehicle; and
   control means for causing the flammability control system to operate or continue operating at a first level of operation when the one or more signals correspond to a first level of flammable vapors in the fuel tank, and at a second level of operation that is less than the first level of operation when the one or more signals correspond to a second level of flammable vapors in the fuel tank that is less than the first level of flammable vapors, wherein the receiving means includes means for receiving a signal from a landing gear system of an aircraft.

21. The system of claim 20, wherein the receiving means includes means for receiving a temperature signal relating to an air temperature outside the fuel tank.

22. The system of claim 20 wherein the receiving means includes means for receiving at least one of an airspeed signal and a rate-of-climb signal relating to an aircraft.

23. The system of claim 20 wherein operating or continuing to operate the flammability control system at a first level of operation includes flowing inert gas into the fuel tank, and wherein operating or continuing to operate the flammability control system at a second level of operation includes at least reducing the flow of inert gas into the fuel tank.

* * * * *